United States Patent
Huang et al.

(10) Patent No.: US 8,740,650 B2
(45) Date of Patent: Jun. 3, 2014

(54) SMARTCARD CONNECTOR HAVING A CIRCUIT BOARD ON A TOP SIDE AND A WAVE ABSORBING ELEMENT ON A BOTTOM SIDE OF AN UPPER CASE

(75) Inventors: Cheng-Wei Huang, Taipei (TW); Hsiang-Yueh Wang, Taipei (TW)

(73) Assignee: Tyco Electronics Holdings (Bermuda) No. 7 Ltd., Pembroke (BM)

( * ) Notice: Subject to any disclaimer, the term of this patent is extended or adjusted under 35 U.S.C. 154(b) by 39 days.

(21) Appl. No.: 13/614,470

(22) Filed: Sep. 13, 2012

(65) Prior Publication Data
US 2014/0073187 A1   Mar. 13, 2014

(30) Foreign Application Priority Data
Sep. 13, 2011   (TW) .............................. 100217080 U

(51) Int. Cl.
*H01R 13/66*   (2006.01)
(52) U.S. Cl.
USPC .................................................... 439/620.15
(58) Field of Classification Search
None
See application file for complete search history.

(56) References Cited

U.S. PATENT DOCUMENTS

| | | | | |
|---|---|---|---|---|
| 3,836,824 | A * | 9/1974 | Watrous | 361/749 |
| 7,479,039 | B2 * | 1/2009 | Ni et al. | 439/620.15 |
| 7,649,742 | B2 * | 1/2010 | Ni et al. | 361/752 |
| 8,541,705 | B2 * | 9/2013 | Dimig | 200/302.2 |
| 2001/0050647 | A1 * | 12/2001 | Kanayama et al. | 343/702 |
| 2006/0164891 | A1 * | 7/2006 | Mills et al. | 365/185.33 |
| 2007/0146214 | A1 * | 6/2007 | Yuba et al. | 343/702 |
| 2008/0003883 | A1 * | 1/2008 | Ni et al. | 439/620.15 |
| 2008/0062038 | A1 * | 3/2008 | Ouchi et al. | 342/175 |
| 2009/0170570 | A1 * | 7/2009 | Uejima et al. | 455/575.3 |
| 2009/0227144 | A1 * | 9/2009 | Ma | 439/620.15 |
| 2011/0201233 | A1 * | 8/2011 | Thill et al. | 439/620.15 |
| 2013/0309907 | A1 * | 11/2013 | Lee et al. | 439/620.15 |

* cited by examiner

*Primary Examiner* — Chandrika Prasad
(74) *Attorney, Agent, or Firm* — Barley Snyder

(57) ABSTRACT

A smartcard connector with a RFID module is provided. The smartcard connector having a casing, a circuit board, a wave absorbing element, and a transmission element. The casing includes an upper case and a lower case positioned with the upper case such that the upper case and the lower case define a smartcard receiving passageway. The circuit board is disposed on an outer side of a top side of the upper case and includes a smartcard connector wiring and an antenna loop. The wave absorbing element is disposed on an inner side of the top side and corresponding in position to and spaced apart by distance from one side of the circuit board. The transmission element is connected to a side of the circuit board.

7 Claims, 5 Drawing Sheets

SMARTCARD CONNECTOR HAVING A CIRCUIT BOARD ON A TOP SIDE AND A WAVE ABSORBING ELEMENT ON A BOTTOM SIDE OF AN UPPER CASE

CROSS-REFERENCE TO RELATED APPLICATION

This application claims the benefit of the filing date under 35 U.S.C. §119(a)-(d) of TW Patent Application No. 100217080, filed Sep. 13, 2011.

FIELD OF THE INVENTION

The invention relates to a smartcard connector, and more particularly, to a smartcard connector having a RFID module.

BACKGROUND

In general, a known smartcard connector can be used to receive a known smartcard, such as a phone card, a debit card, or a credit card, and electrically connect that smartcard to an electronic device, so as to perform data transmission. The body of a known smartcard connector is typically a base. A slot is formed inside the base for being insertion of and receiving the known smartcard. The base of the known smartcard connector is installed on the frame of an electronic device (such as a notebook computer, a cell phone, or a card reader) and electrically connected to the electronic device.

However, nowadays, most electronic devices show a trend for multifunctional, compact, and lightweight models. Therefore, it is important for designers to enable various functional constituent elements to be installed on an electronic device of limited space. The prior art discloses integrating a radio frequency identification (RFID) model and a smartcard connector with a view to reducing the space required for installation. For example, Taiwan utility model patent M345435 discloses a card insertion-style communication element, which includes a RF module and an insertion portion. A corresponding information element is inserted into the insertion portion. The RF module receives a wireless signal or transmits the wireless signal to an external device. However, the aforesaid prior art does not teach the relative positions of the insertion portion and the RF module definitely and in detail. In general, a RFID module and a smartcard connector are of different dimensions and specifications, and therefore their integration is confronted with much difficulty. Accordingly, there is a need to enable a RFID module and a smartcard connector to maintain quality antenna performance after the integration thereof.

SUMMARY

A smartcard connector with a RFID module is provided. The smartcard connector having a casing, a circuit board, a wave absorbing element, and a transmission element. The casing includes an upper case and a lower case positioned with the upper case such that the upper case and the lower case define a smartcard receiving passageway. The circuit board is disposed on an outer side of a top side of the upper case and includes a smartcard connector wiring and an antenna loop. The wave absorbing element is disposed on an inner side of the top side and corresponding in position to and spaced apart by distance from one side of the circuit board. The transmission element is connected to a side of the circuit board.

BRIEF DESCRIPTION OF THE DRAWINGS

After reading the drawings and the description below, persons skilled in the art can gain insight into the system and method of the invention. For those embodiments, which are not described in detail below or are not restrictive of the invention, please refer to the accompanying drawings. Constituent elements shown in the accompanying drawings are not necessarily drawn to scale, as the accompanying drawings are intended to emphasize the principles applied to the invention. In the accompanying drawings, like elements are denoted by like reference numerals.

DETAILED DESCRIPTION OF THE EMBODIMENT(S)

Various aspects of the invention are described hereunder by making reference to schematic diagrams of the various embodiments of the invention. Therefore, expectedly, the shapes of the constituent elements shown in the diagrams will vary, depending on manufacturing technology, design, and/or tolerance. Accordingly, the described various aspects of the invention should not be deemed as restrictive of specific elements or shapes of constituent elements of the invention, but should be interpreted as illustrative of any shape-related differences resulting from a manufacturing process.

Figure 1:
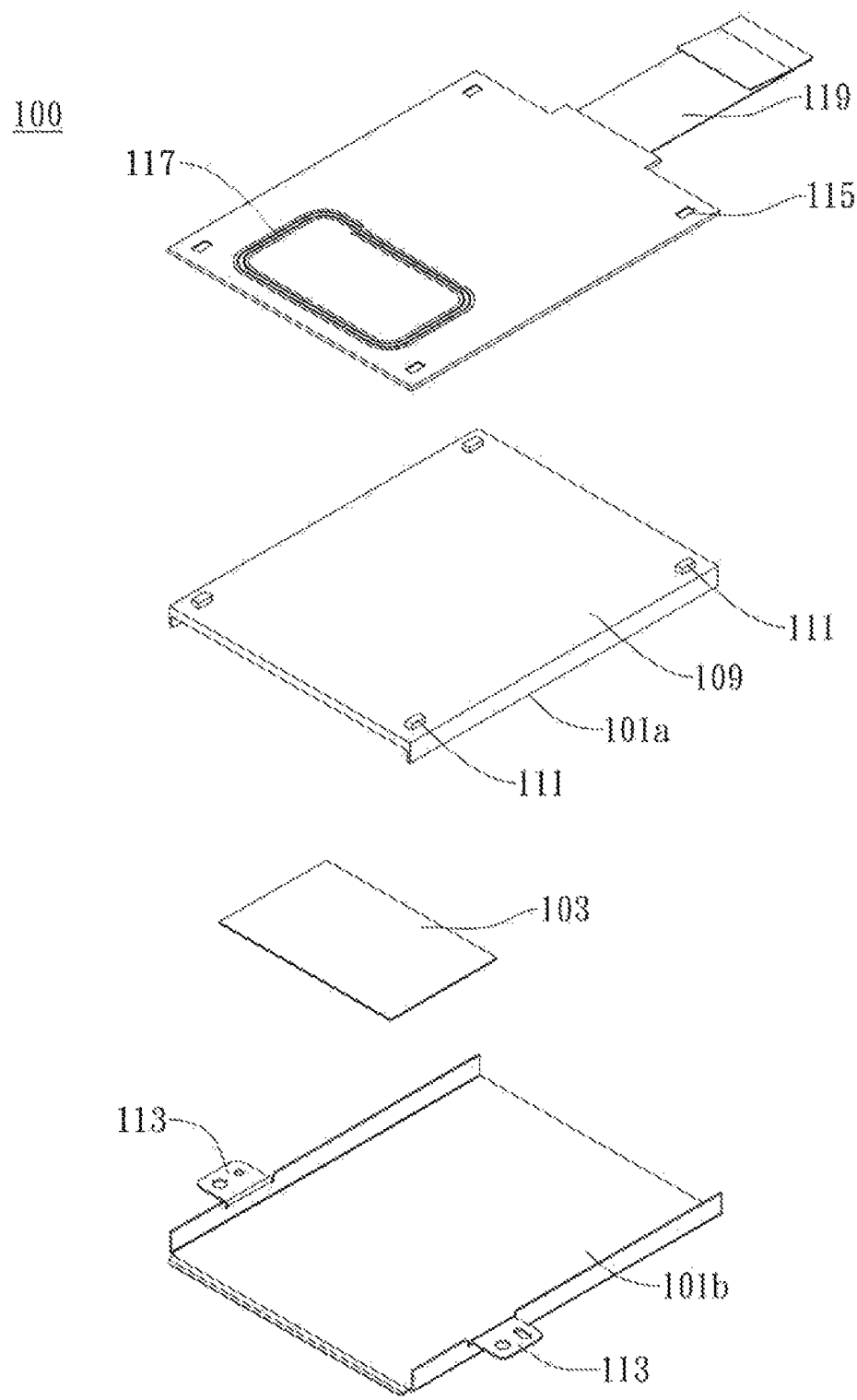
FIG. 1 is an exploded view of a smartcard connector according to the invention.
Figure 2:
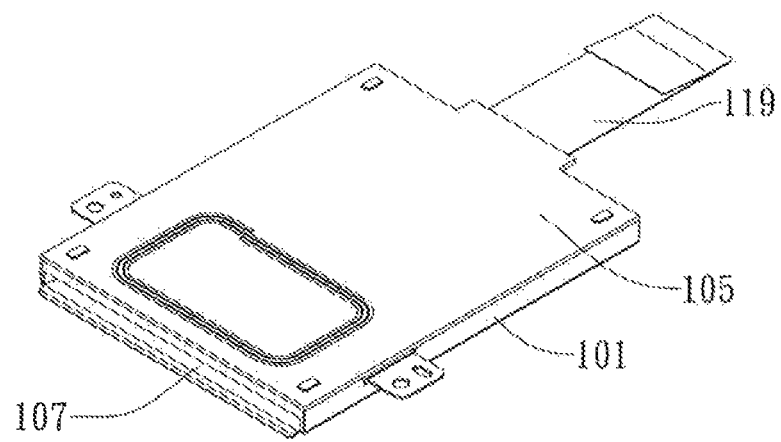
FIG. 2 is an assembled perspective view of a base and a wave absorbing element according to the smartcard connector shown in FIG. 1.

Now with reference to FIG. 1 and FIG. 2, which discloses a smartcard connector 100 having a RFID module. As shown, the smartcard connector 100 includes a casing 101, a wave absorbing element 103, and a circuit board 105. In the embodiment shown, the casing 101 has a flat cubic shape and provides structural support to the smartcard connector 100, and includes an upper case 101a and a lower case 101b. The upper case 101a and the lower case 101b jointly define the space of a slot 107 for receiving a smart card, such that the smart card can be inserted into the slot 107 as shown in FIG. 2.

In an aspect of the invention, four square protrusions 111 are formed at four corners of a top side 109 of the upper case 101a, respectively. The protrusions 111 extend from the top side 109 and in a direction perpendicular to the top side 109. The protrusions 111 are for use in a subsequent assembly process whereby the circuit board 105 is fixed to the casing 101. In another embodiment, the protrusions 111 are disposed at any other positions on the top side 109 rather than confined to the corners of the top side 109, nor is the number of the protrusions 111 restricted to four. For example, a single protruding portion is also applicable to the invention, depending on the design of the connector. Optionally, in the embodiment shown, an extension 113 is formed at each of the two sides of the lower case 101b, and the extension 113 has a receiving passageway to receive and engage with a fastening element, such that the smartcard connector 100 can be fastened and fixed to an electronic device, for example.

In the shown embodiment, the circuit board 105 is disposed on the top side 109 of the upper case 101a. Four square protrusion receiving passageways 115 are formed at four corners of the circuit board 105, respectively. The protrusion receiving passageways 115 correspond in position to the protrusions 111 on the top side 109, respectively. During an assembly process, the four protrusions 111 on the top side 109 are positioned with the four protrusion receiving passageways 115 on the circuit board 105, respectively, such that the protrusions 111 can be passed through and engaged with the protrusion receiving passageways 115, respectively, thereby allowing the circuit board 105 to be fixed to the casing 101.

The circuit board 105 of the invention essentially includes a smartcard connector wiring (not shown) and an antenna loop 117, and is integrated with various components capable of performing radio frequency identification, such as a radio frequency chip and a radio frequency circuit (not shown). The antenna loop 117 is coupled to the radio frequency circuit in the circuit board 105 and thereby electrically connected to the radio frequency chip in order to transmit a signal. Furthermore, a transmission element 119, such as a flexible flat cable (FFC) or a flexible printed circuit (FPC), is connected to one side of the circuit board 105 for receiving a data signal or sending the data signal to a smart card inserted into the slot 107. Since both the smartcard connector wiring and the radio frequency circuit are integrated with the circuit board 105, the transmission element 119 can transmit a radio frequency signal generated by the antenna loop 117 as a result of sensing. In another embodiment, the transmission element 119 is a solder wire, and, in such a situation, the casing 101 and the circuit board 105 thereon are directly secured to a circuit board 105 or any other connector (not shown) by wire bonding. In yet another embodiment, the transmission element 119 is a connector of another type, wherein the connector enables the invention to attain board-to-board connection and transmission.

Referring to FIG. 1, the wave absorbing element 103 is a thin sheet designed to conform with the upper flat side of the casing 101. In this embodiment, the wave absorbing element 103 comes in the form of a wave absorbing patch having an adhesive layer that allows the wave absorbing element 103 to adhere to a bottom side of the upper case 101a and corresponds in position to one side of the circuit board 105. In the shown embodiment, the wave absorbing element 103 improves the sensing performance of the antenna loop 117. Therefore, the wave absorbing element 103 is disposed right beneath the antenna loop 117 to cover horizontally at least the area enclosed by the antenna loop 117. After being flatly attached to the upper flat side of the casing 101, the wave absorbing element 103 becomes parallel to the circuit board 105 and is spaced apart therefrom by a predetermined distance which depends on the thickness of the upper case 101a. The distance that separates the antenna loop 117 and the wave absorbing element 103 improves the sensing performance of an RFID element in the circuit board 105 efficiently. Given the aforesaid design, the adjustment of the thickness of the casing 101 of the connector is effective in adjusting the distance between the antenna loop 117 and the wave absorbing element 103, so as to achieve the optimal antenna sensing performance of a RFID module.

Figure 3:
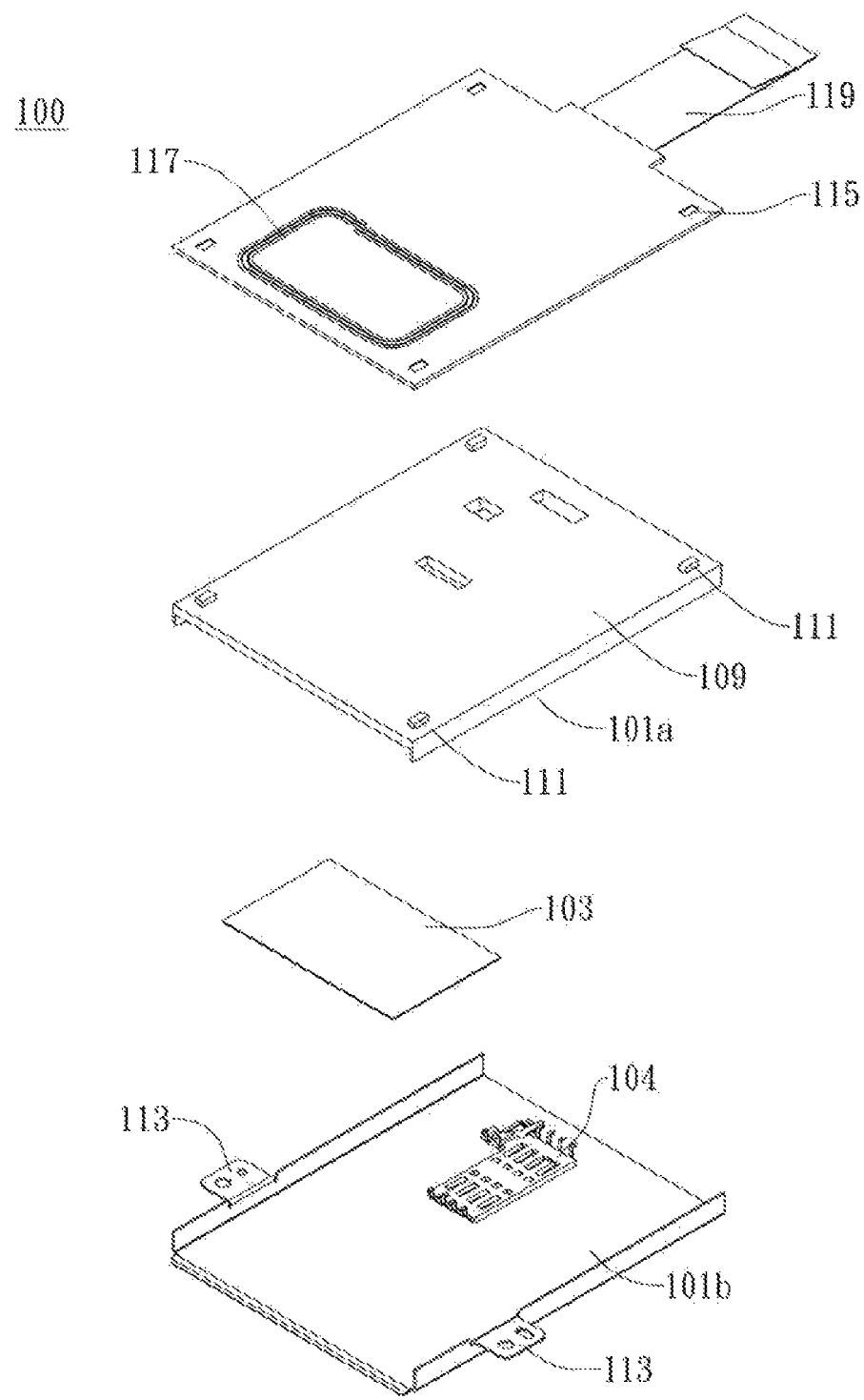
FIG. 3 is an exploded view of another smartcard connector according to the invention.

Now with reference to FIG. 3, another smartcard connector according to the invention is shown. An element in the embodiment of FIG. 3 and an element in the embodiment of FIG. 1 will be denoted by identical or similar reference numerals, respectively, if the two elements are identical or similar, for the sake of brevity and easy comprehension of the description herein. The embodiment of FIG. 3 and the embodiment of FIG. 1 are substantially the same, except that, in the shown embodiment of FIG. 3, a connector body 104 is provided, and the connector body 104 is disposed inside the casing 101, such that the connector body 104 and the transmission element 119 are electrically connected, thereby allowing a smart card 120 to be electrically connected to the transmission element 119 as soon as the smart card 120 is inserted into a slot 107 defined by the upper case 101a and the lower case 101b.

Figure 4:
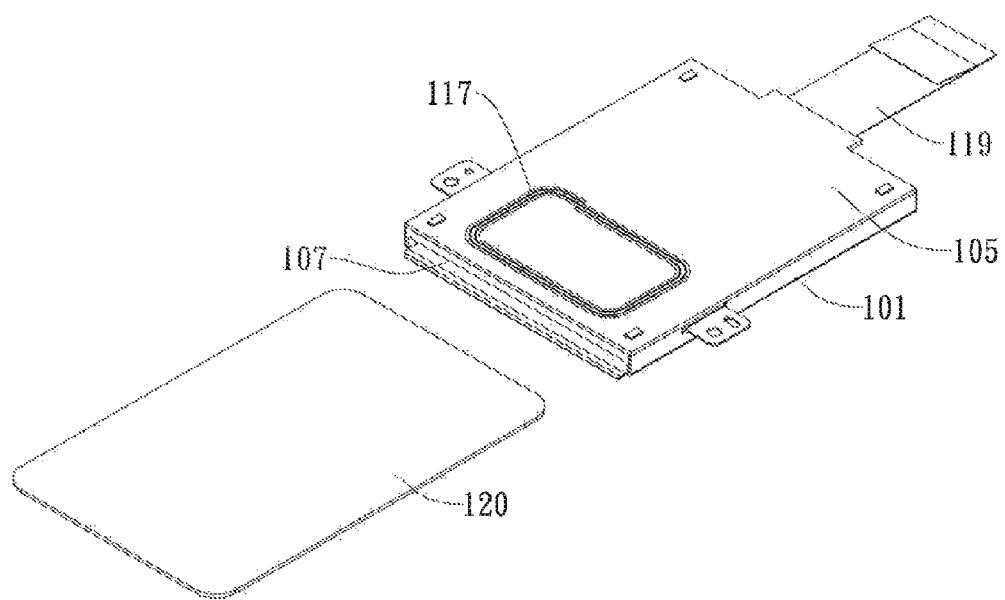
FIG. 4 is an exploded schematic view of a smartcard connector according to the invention that adapted to receive a smart card.
Figure 5:
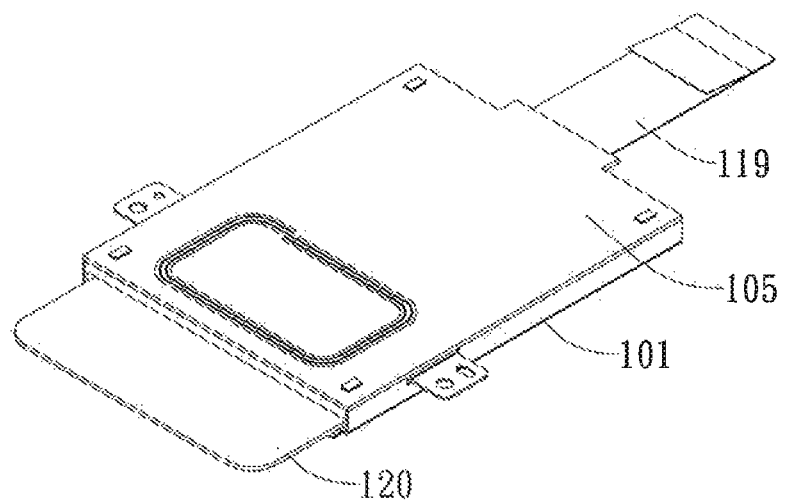
FIG. 5 is an assembled schematic view of a smartcard being inserted into a smartcard connector according to the invention.

With reference to FIG. 4 and FIG. 5, a smart card 120 having an integrated circuit chip (not shown) for storing, encrypting, and processing data can be electrically connected to the connector body 104 by coming into contact therewith, such that data is transmitted between the smart card 120 and the transmission element 119 (as shown in FIG. 3). Alternatively, data is transmitted between the smart card 120 and the transmission element 119 by a non-contact means, such as radio frequency (RF), infrared (IF), or induced electromotive force. Alternatively, data is transmitted between the smart card 120 and the transmission element 119 by a mixture of a contact means and a non-contact means. In an embodiment of the invention, data is transmitted between the smart card 120 and the transmission element 119 as soon as the smart card 120 is inserted into a slot 107 defined by the upper case 101a and the lower case 101b, through an integrated circuit chip of the smart card 120 and by a contact means, by a non-contact means, or by a mixture of a contact means and a non-contact means, as shown in FIG. 5.

In the shown embodiment, the invention provides a smartcard connector 100 with a RFID module, wherein a smart card 120, such as a credit card, a prepaid card, an e-wallet, a cash card, or an access control card, can be inserted into the smartcard connector 100.

After studying the aforesaid embodiments and the accompanying drawings, persons skilled in the art can gain insight into the structural features of various embodiments of the invention. The description of the aforesaid embodiments and the accompanying drawings are not restrictive of the structures, methods, devices, and all the components and features of the systems described herein. After perusing the specifications of the invention, persons skilled in the art can gain insight into plenty of other embodiments of the invention and therefore are able to perform structural and logical replacements and changes of the invention without departing from the scope thereof based on or derived from the disclosure contained in the invention. For example, the shape of the casing 101 of the smartcard connector of the invention is not limited to the cube shown in the accompanying drawings; instead, it can be a rectangle. The wave absorbing element 103 is not necessarily of the shape and appearance depicted in the accompanying drawings. Furthermore, the accompanying drawings serve solely an illustrative purpose and therefore are not drawn to scale. Part of a diagram is enlarged and emphasized as needed, whereas the other part of the diagram is simplified or omitted. Accordingly, the disclosure contained in the invention and the accompanying drawings should be deemed illustrative rather than restrictive and should be defined by the appended claims.

What is claimed is:

1. A smartcard connector with a RFID module, comprising:
　　a casing having an upper case and a lower case positioned with the upper case such that the upper case and the lower case define a smartcard receiving passageway;
　　a circuit board disposed on a top side of the upper case and having a smartcard connector wiring and an antenna loop on the top side;
　　a wave absorbing element disposed on a bottom side of the upper case and corresponding in position to and spaced apart by distance from one side of the circuit board; and a transmission element connected to a side of the circuit board.

2. The smartcard connector with a RFID module of claim 1, further comprising a protrusion disposed on the top side.

3. The smartcard connector with a RFID module of claim 2, further comprising a through hole disposed along the circuit board and engageable with the protrusion.

4. The smartcard connector with a RFID module of claim 3, wherein the protrusion is disposed at a corner of the top side.

5. The smartcard connector with a RFID module of claim 1, wherein the lower case includes an extension.

6. The smartcard connector with a RFID module of claim 1, wherein data is transmitted between a smart card and the transmission element by a non-contact means, such as radio frequency, infrared, or induced electromotive force.

7. The smartcard connector with a RFID module of claim 1, further comprising a connector body electrical connected to the transmission element when a smart card is inserted into the smartcard receiving passageway.

\* \* \* \* \*